Oct. 16, 1956 C. S. BLACK Re. 24,227
PICKUP TRAILER
Original Filed March 16, 1953 2 Sheets-Sheet 1
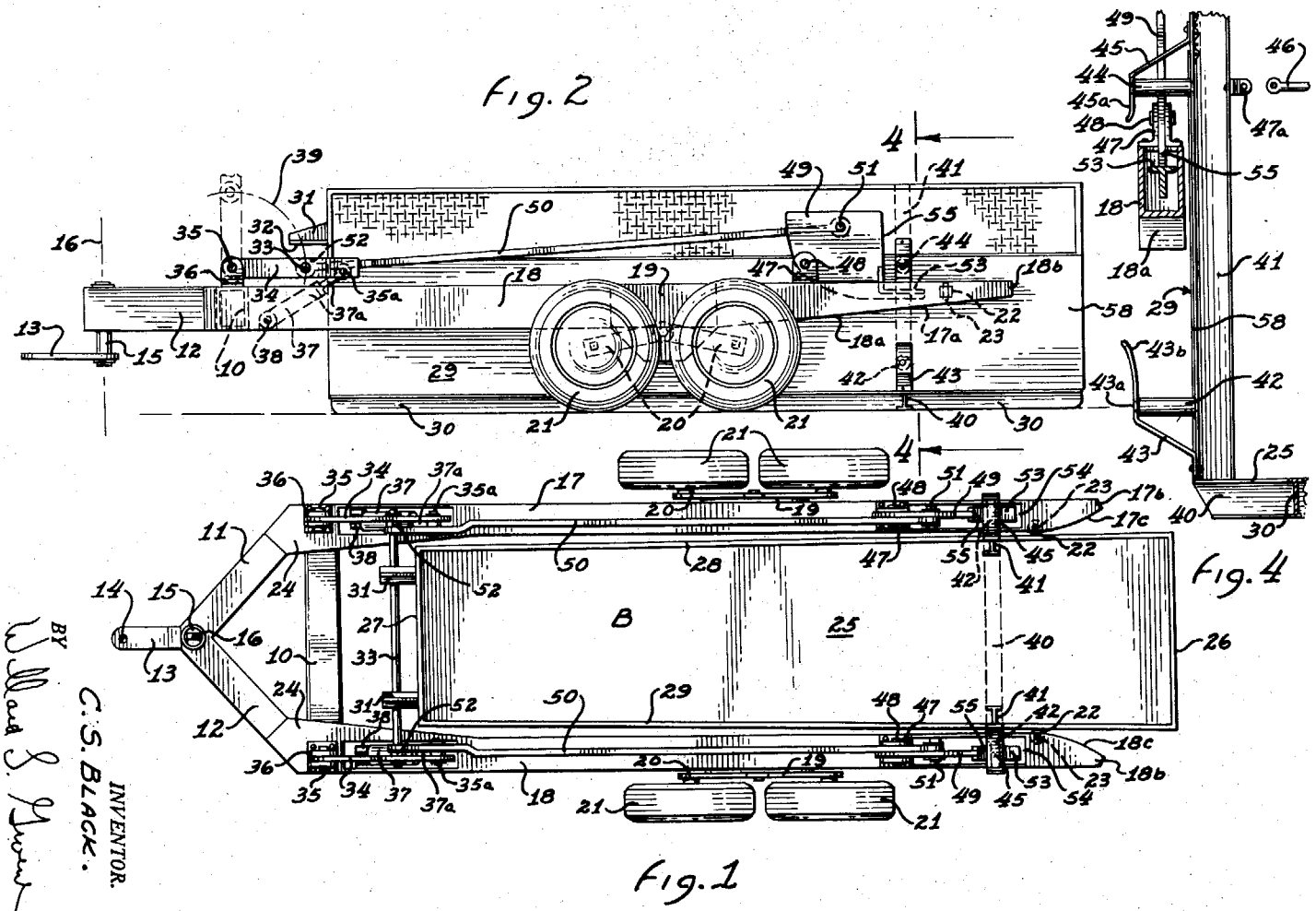
INVENTOR.
C. S. BLACK.
BY
Willard S. Grover
ATTORNEY.

Oct. 16, 1956
C. S. BLACK
PICKUP TRAILER
Re. 24,227
Original Filed March 16, 1953
2 Sheets-Sheet 2
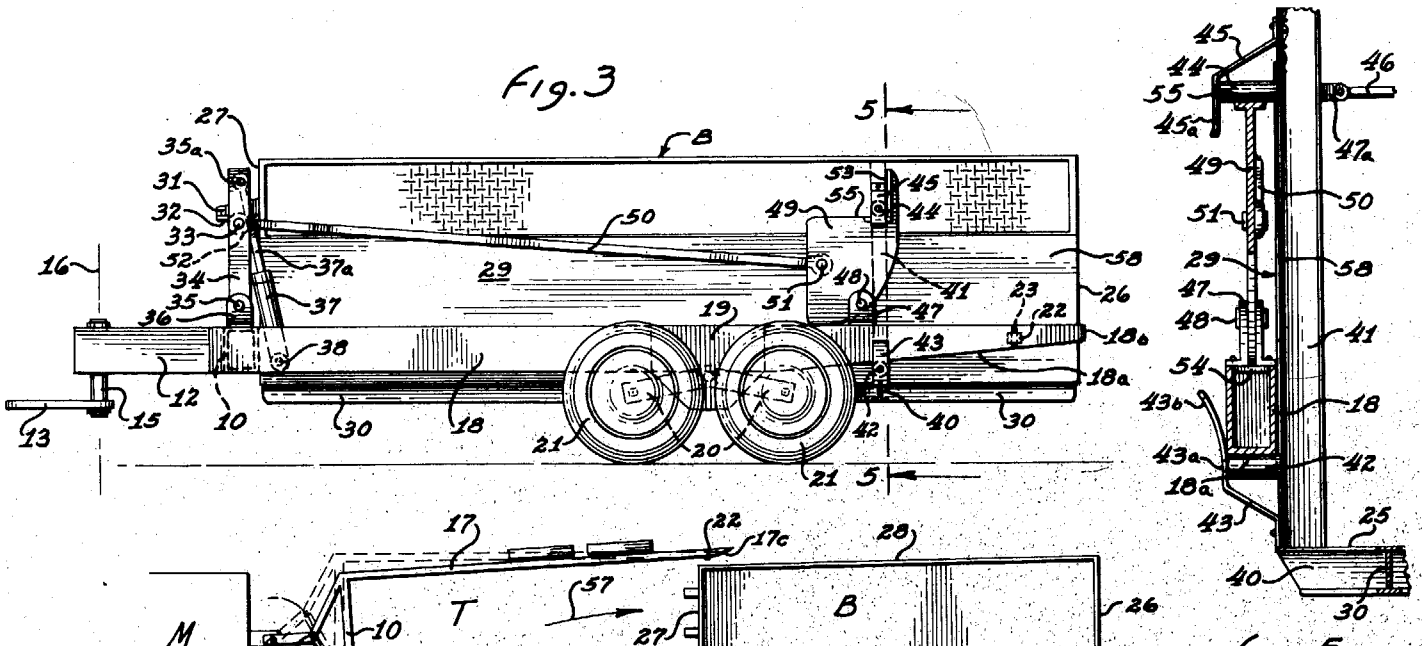
Fig. 3
Fig. 5
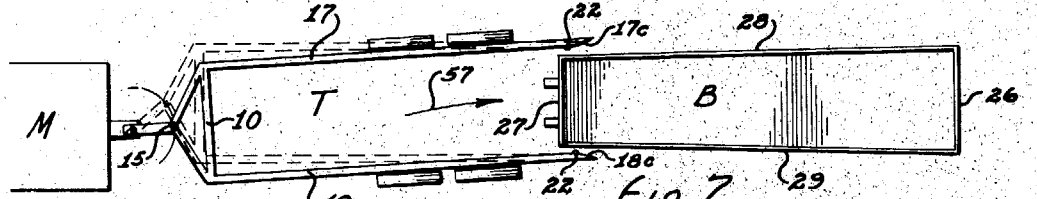
Fig. 7
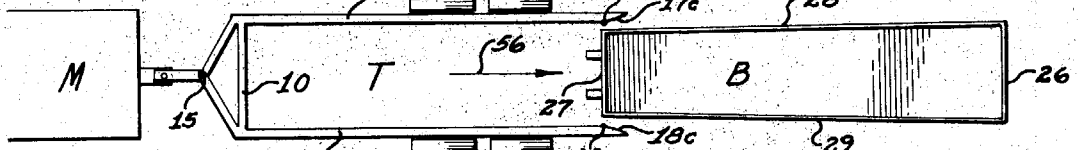
Fig. 6
INVENTOR.
C. S. BLACK.
BY
Willard G. Grover
ATTORNEY.

United States Patent Office

Re. 24,227
Reissued Oct. 16, 1956

24,227

PICKUP TRAILER

Clarence S. Black, Phoenix, Ariz.

Original No. 2,693,288, dated November 2, 1954, Serial No. 342,462, March 16, 1953. Application for reissue April 29, 1955, Serial No. 505,080

20 Claims. (Cl. 214—390)

Matter enclosed in heavy brackets [ ] appears in the original patent but forms no part of this reissue specification; matter printed in italics indicates the additions made by reissue.

This invention pertains to improvements in cotton trailers, and particularly to cotton pickup trailers having independent demountable basket portions which may be serviced from a single wheel mounted trailer towed by a motor vehicle.

After cotton is picked the hauling of it from the farm to the gin presents certain handling problems and expensive equipment. Heretofore in the past some thirty four-wheeled trailers, representing a substantial investment were required on plantings of about one thousand acres. If a farmer's cotton could be ginned as fast as it is picked and hauled in, investment could be greatly reduced but during much of the picking season trailers full of seed-cotton accumulate in gin yards waiting for the processing.

The speed with which the cotton is picked in the field, either manually or by machine, is quite important to the overall hauling process between the field and the gin. The faster it is picked and hauled, the harder it is for the gin to keep up with the supply. There is also the remnant factor. When an odd amount, that is not enough to complete a full bale, remains in a trailer that trailer is tied up in the yard until the farmer sends more cotton so that the remnant can be combined and used up.

The object of applicant's present invention is to provide an improved cotton pickup trailer having a trailer element with road wheels and a plurality of cotton carrying baskets which may be picked up, transported, and set down at the gin yard while keeping the trailer element in constant use and in no wise tying up this more expensive piece of equipment.

One of the objects of this invention is to provide a U-shaped pickup trailer cooperatively related to a cotton pickup basket pallet, load-carrying frame or the like which is of rugged construction, economical to manufacture, and low in overall cost and operation.

Still another object of this invention is to provide an improved pickup trailer arrangement comprising U-shaped road vehicle member and a load carrying basket cooperating with the trailer.

Still another object of this invention is to provide an improved pickup trailer having a U-shaped frame member with road wheels and a load carrying basket adapted to be picked up from a ground contact position to a transporting position on said U-shaped trailer.

Still another object of this invention is to provide an improved cotton pickup trailer including a U-shaped trailer member having road wheels and a tongue carried by a towing vehicle together with a load carrying basket and special pickup mechanism adapted to be brought into position with said load carrying basket by backing the trailer around the basket and lifting said basket to a road travel carrying position, the trailer having no overhead members which could interfere with full access to the load in the basket.

Still another object of this invention is to provide an improved pickup trailer having a U-shaped road vehicular member and a load carrying basket and means for locking the rear ends of the trailer through the basket in a rigid box shaped structure when transporting the load.

Still another object of this invention is to provide a U-shaped trailer member cooperating with a tapered load carrying basket which is picked up from ground contact position and lifted to a locked load carrying position on the U-shaped trailer member and in which lifting operation the basket serves to lock the rear ends of the U-shaped trailer member together in a rigid box shaped structure when carrying the load over the road.

Further features and advantages of this invention will appear from a detailed description of the drawings in which:

Fig. 1 is a plan view of the trailer assembly at the time of picking up the load carrying basket from ground contacting position.

Fig. 2 is a side elevation of the apparatus shown in Fig. 1.

Fig. 3 is a side elevation similar to that of Fig. 2 but showing the load carrying basket raised to road traveling position.

Fig. 4 is a section on the line 4—4 of Fig. 2.

Fig. 5 is a section on the line 5—5 of Fig. 3.

Fig. 6 is a diagrammatic plan view showing the trailer about to be backed around the load carrying basket.

Fig. 7 shows another stage of the trailer being backed around the load carrying basket.

As illustrative of one form of this invention there is shown the U-shaped trailer member comprising the front box shaped transverse member 10 to the ends of which are fixed the angularly disposed tongue carrying members 11 and 12 to which is fixed the tongue 13 connectable by suitable hitch means at 14 to the motor vehicle M utilized for towing and maneuvering the trailer. If desired, a limited motion connection 15 may be provided so that the tongue 13 may have limited swinging movement about an axis 16 as shown in Figs. 3 and 7, and also automatically self-aligned to the position shown in Fig. 1 for normal pulling and towing operations of the trailer member, such apparatus being preferably of the type shown in co-pending application, Serial No. 362,583 filed June 18, 1953.

Extending rearwardly from the transverse member 10 are the two side frame members 17 and 18 each having wheel supporting plates 19 to which are carried the articulated wheel supporting members 20 upon which are mounted suitable road wheels 21. Rearwardly of the road wheels and plate 19 the lower surface of the side frame members 17 and 18 taper upwardly respectively at 17a and 18a terminating in reduced end portions at 17b and 18b. The side frames are also formed with divergent curved surfaces at 17c and 18c and each is provided with a load carrying basket contacting roller 22 mounted on a suitable trunnion pin 23 as best seen in Fig. 1. Suitable gusset plates or strengthening members 24 tie the transverse member 10 to the members 11, 12, 17, and 18 to form a rigid U-shaped or C-shaped structure extending rearwardly of the transverse member 10.

The load carrying basket comprises a bottom 25 the rear end 26 the front end 27 and the sides 28 and 29 which converge toward the front end 27, so that the front end of the basket is narrower than the rear portion thereof as best seen in Fig. 1. Suitable skid bars 30 are mounted on the bottom 25 to afford the ground support for the basket when released from the carrying trailer.

Fixed on the front wall 27 of the load carrying basket are the forwardly projecting lugs 31 having the horizontally disposed abutment surfaces 32 which are adapted to engage the front transverse lifting bar 33, which bar 33 is rigidly secured to the swinging arms 34 and which arms in turn are pivotally mounted at 35 on suitable support brackets 36 fixed to the frame members 17 and 18 of the trailer. Connected to each of the arm members 34 by a pivotal pin 35a is the piston rod 37a of the fluid pressure actuating cylinders 37 in turn pivotally mounted at 38 on the side frames 17 and 18 of the trailer. Thus, by suitably applying fluid pressure to the cylinders 37 the bar 33 may be raised or lowered along the arcuate path of travel 39.

Toward the rear portion of the load carrying basket and under the floor 25 thereof is rigidly secured a transverse beam 40 which serves as a tie member across this portion of the basket to which are also secured upright supports 41. Secured to the member 41 is the bottom abutment pin or stop member 42 which is additionally supported at its outer end by the angular plate member 43 secured appropriately to the members 40—41. The member 43 further extends upwardly and slightly outwardly at the portion 43a and terminates in the final flared out portion 43b as best seen in Figs. 4 and 5. Above the member 42 and 43 is the upper abutment pin 44 which is also secured to the upright 41 and has an additional angular supporting plate 45 and a slightly downwardly extending portion 45a. A suitable tie-rod 46 connected to the members 41 by the eye bolt connection at 47a gives adequate stability to the frame structure 40—41—46 to which the members 42 and 44 are connected.

Pivotally mounted on suitable supports 47 fixed to the rear portions of the members 17 and 18 of the trailer by pins 48 are the pickup links 49 which are connected by tie rods 50 pivotally mounted on suitable pins 51 of the links 49, with the ring members 52 journaled around the transverse pickup bar 33. The pickup links 49 when in retracted releasing position as shown in Fig. 2 have horizontally disposed pickup surfaces 53 which preferably drop into recessed openings 54 in the outer ends 17a and 18a of the frame of the trailer. A vertically disposed abutment surface 55 is also formed on the pickup links 49 and joined with the surfaces 53 at the front end thereof. By means of the tie rods 50 and the links 49 are actuated in synchronism with the movement of the bar 33 by the cylinders 37 so that the links 49 move from a position shown in Fig. 2 to the lifting position shown in Fig. 3.

With the basket pickup elements 33—49 in lowered pickup position as shown in Fig. 2, the trailer T, Fig. 6, which is connected to a suitable motor vehicle M by the hitch mechanism described, is backed in the direction indicated by the arrow 56 so as to bring the side members 17 and 18 down each side of the load carrying basket B which at this time is resting on the skids 30 on the ground surface. By utilizing the tapered front portion of the basket B greater ease of handling and manipulating the trailer T to bring the side members along each side of the basket B is thus effected as at the beginning of the backing operation in the direction 56 there is a wide berth between the end surfaces 17c and 18c of the side members 17 and 18 so that precise alignment or extreme care in driving the motor vehicle M is not required. Even should the driver be more or less careless in aligning his trailer with the basket as shown in Fig. 7 the tapered nature of the basket and the flared ends of the members 17 and 18 still provide ample capacity to allow the trailer to be maneuvered easily fully around the basket. Further, the adjustable link connection at 15 may be utilized if desired to allow the trailer to swing itself in the arcuate path 57 to align itself with the basket member B. It is also to be noted that there is provided side plates 58 preferably of solid flat plate decking, which is adapted to be engaged by the rollers 22 of the members 17 and 18 to effect quick and positive alignment of the trailer and basket without any especial skill or care being required upon the part of the driver of the motor vehicle M.

The trailer is backed fully in against the front of the basket until the supporting prong members 31 on the basket and the pin members 44 thereof come to the position shown in Fig. 2, the pins 44 striking the abutment surfaces 55 of the lifting links 49. Fluid pressure then applied to the cylinders 37 causing the transverse front lifting bar 33 to raise up and engage the abutment surfaces 32 of the lug member 31 at the front of the basket. The link members 49 also swing upwardly toward the position shown in Fig. 3 so as to pick up the pins 44 on the basket in the crotch formed between the surfaces 53 and 55 of the members 49. Continued upward movement of the members 33 and 49 cause the basket to be lifted upwardly and pulled forwardly by the surface 53 acting against the rear portion of the pins 44 until the basket is finally positioned in carrying condition as shown in Fig. 3. It is to be noted that the basket is held against withdrawal from the trailer by the surface 53 of the member 49 which is now in a vertical position as shown in Fig. 3 for transporting the load carrying basket B.

It is further important to note that at the same time that the basket is lifted by the members 49 the rear portions 17a and 18a of the members 17 and 18 of the side frames of the trailer are drawn relatively against the lower stop pins 42 of the basket as best seen in Fig. 5 and that the end portions of the frame members 17 and 18 are secured between the members 41 and 43b so that they nicely fit between the members 43a and the members 41 so as to positively lock these end portions of the frame members 17 and 18 into the basket structure and through the transverse tie member 40 provide a rigid transverse support for the outer ends of the trailer when the basket is being transported over the road with its load. Thus, when the basket is picked up there is automatically provided a cross bridge or locking tie bar 40 and its associated members as shown in Fig. 5 forming a rigid box-like structure across the outer ends of the members 17 and 18 of the trailer acting in conjunction with the transverse member 10 at the front of the trailer structure. Thus, an extremely rigid trailer is provided capable of carrying heavy loads with high efficiency and with ease in handling. Obviously, at the end of the trip when material is to be removed from the basket the basket may be readily unloaded, as in the case of cotton pickings, by working in through the top of the basket with vacuum pickup means or other suitable means since there is no interference over the top of the basket whatsoever even when in traveling position on the trailer with this structure.

Further, should it be desired to leave the basket at any location it is merely necessary to discharge fluid pressure from the cylinders 37 and allow the basket to settle back to the position shown in Fig. 2 on the ground surface and to drive off immediately with the trailer T to pick up or manipulate any other basket. Thus, not only is the device extremely versatile and simple in construction but it also permits greater ease in handling the baskets and greater ease in taking the load out of or loading the material into the basket when it is in carrying position on the trailer structure.

A catch may preferably be provided at the front of the trailer securing the basket to the trailer frame when in fully lifted and forward position so that in the event of a hydraulic or power failure or inadvertent operation of the lifting mechanism, the basket cannot be dropped while the trailer is in motion.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A pickup trailer apparatus including a trailer member, a transverse frame at the front of said trailer member, a pair of spaced side frame members rigidly secured to the outer ends of said transverse frame, a hitch secured to said transverse frame, divergent surfaces on the outer ends of said side frame members, ground contacting wheels journaled intermediate the ends of said side frame members, a load carrying basket member having divergently arranged sides from front to rear adapted to be presented between said side frame members, means on said trailer member to engage, lift and support said basket member on said trailer member, comprising a front transverse bar member, lever arms fixed to the outer ends of said bar member and pivotally mounted at the outer ends of said transverse frame member, power actuating means on said trailer member for swinging said lever arms and bar member, lifting lugs on the front of said basket having horizontally disposed abutment surfaces presented over and engaging said bar member, and means on the rear portion of said side frame members to engage cooperating members on said basket member to raise and move said basket member forwardly relative to said trailer member.

2. A pickup trailer apparatus including a trailer member, a transverse frame at the front of said trailer member, a pair of spaced side frame members rigidly secured to the outer ends of said transverse frame, a hitch secured to said transverse frame, divergent surfaces on the outer ends of said side frame members, ground contacting wheels journaled intermediate the ends of said side frame members, a load carrying basket member having divergently arranged sides from front to rear adapted to be presented between said side frame members, means on said trailer member to engage, lift and support said basket member on said trailer member, comprising a front transverse bar member, lever arms fixed to the outer ends of said bar member and pivotally mounted at the outer ends of said transverse frame member, power actuating means on said trailer member for swinging said lever arms and bar member, lifting lugs on the front of said basket having horizontally disposed abutment surfaces presented over and engaging said bar member, means on the rear portion of said side frame members to engage cooperating members on said basket member to raise and move said basket member forwardly relative to said trailer member, and a link means interconnecting said lever arms and said means on the rear portion of said side frame members to maintain the abutment surfaces on said lifting lugs in contact with said transverse bar member.

3. A pickup trailer apparatus including a trailer member, a transverse frame at the front of said trailer member, a pair of spaced side frame members rigidly secured to the outer ends of said transverse frame, a hitch secured to said transverse frame, divergent surfaces on the outer ends of said side frame members, ground contacting wheels journaled intermediate the ends of said side frame members, a load carrying basket member having divergently arranged sides from front to rear adapted to be presented between said side frame members, means on said trailer member to engage, lift and support said basket member on said trailer member, comprising a front transverse bar member, lever arms fixed to the outer ends of said bar member and pivotally mounted at the outer ends of said transverse frame member, power actuating means on said trailer member for swinging said lever arms and bar member, lifting lugs on the front of said basket having horizontally disposed abutment surfaces presented over and engaging said bar member, an actuating member pivotally mounted on the rearward portions of each of said side frame members, a connecting rod pivotally interconnecting said actuating members to said lever arms for said transverse bar member, a stop abutment on said actuating members, a lifting abutment on said actuating members forming a crotch with said stop abutment, and a lifting trunnion fixed on each side of said basket member adapted to be engaged by said stop and lifting abutments.

4. A pickup trailer apparatus including a trailer member, a transverse frame at the front of said trailer member, a pair of spaced side frame members rigidly secured to the outer ends of said transverse frame, a hitch secured to said transverse frame, divergent surfaces on the outer ends of said side frame members, ground contacting wheels journaled intermediate the ends of said side frame members, a load carrying basket member having divergently arranged sides from front to rear adapted to be presented between said side frame members, means on said trailer member to engage, lift and support said basket member on said trailer member, comprising a front transverse bar member, lever arms fixed to the outer ends of said bar member and pivotally mounted at the outer ends of said transverse frame member, power actuating means on said trailer member for swinging said lever arms and bar member, lifting lugs on the front of said basket having horizontally disposed abutment surfaces presented over and engaging said bar member, an actuating member pivotally mounted on the rearward portions of each of said side frame members, a connecting rod pivotally interconnecting said actuating members to said lever arms for said transverse bar member, a stop abutment on said actuating members, a lifting abutment on said actuating members forming a crotch with said stop abutment, a lifting trunnion fixed on each side of said basket member adapted to be engaged by said stop and lifting abutments, a transverse tie bar fixed under said basket, and latch means connected to the outer ends of said tie bar adapted to engage the outer ends of said side frame member to arrest upward movement of said basket member and to rigidly lock said side frame members against transverse displacement.

*5. In a pickup vehicle, the combination of: a generally* U*-shaped frame including a transverse frame member having side frame members rigidly connected to and extending from said transverse frame member; a separate, detachable load-carrying member receivable between said side frame members; ground-engaging wheel means supporting said frame for maneuvering said frame relative to said load-carrying member into a position wherein said side frame members straddle said load-carrying member and receive it therebetween; lifting means on said frame and engageable with said load-carrying member for lifting said load-carrying member upwardly into a traveling position between said side frame members, said lifting means including lifting members pivotally mounted on said frame adjacent said transverse frame member and adjacent the free ends of said side frame members and engageable with said load-carrying member at longitudinally spaced points thereon; and two rigidly-interconnected, rigid locking means on said load-carrying member and spaced apart transversely of said load-carrying member for rigidly interlocking with said side frame members, respectively, automatically as said load-carrying member is lifted into said traveling position between said side frame members, whereby to rigidly interconnect said side frame members automatically so as to prevent relative movement of said side frame members.*

*6. In a pickup vehicle, the combination of: an open, generally* U*-shaped frame including a transverse frame member at one end only and including side frame members rigidly connected to and extending from said transverse frame member; a separate, detachable load-carrying member receivable between said side frame members; ground-engaging wheel means supporting said frame for maneuvering said frame relative to said load-carrying*

*member into a position wherein said side frame members straddle said load-carrying member and receive it therebetween; lifting means on said frame and engageable with said load-carrying member for lifting said load-carrying member upwardly into a traveling position between said side frame members; two, rigid locking means on and spaced apart transversely of said load-carrying member for rigidly interlocking with said side frame members, respectively, automatically as said load-carrying member is lifted into said traveling position between said side frame members; and transverse tie means on said load-carrying member and rigidly interconnecting said locking means, whereby to rigidly interconnect said side frame members automatically when said load-carrying member is in said traveling position between said side frame members so as to prevent relative movement of said side frame members.*

*7. A pickup vehicle as defined in claim 6 including interengageable means on said locking means and said side frame members for arresting upward movement of said load-carrying member relative to said frame.*

*8. In a load-transporting apparatus receivable between side frame members of a U-shaped frame and adapted to be lifted upwardly into a traveling position between the side frame members by a lifting means which includes upwardly-facing lifting members on the side frame members, the combination of: a separate detachable load-carrying members receivable between the side frame members of the U-shaped frame, said load-carrying member having downwardly-facing lifting abutments thereon adapted to seat on the upwardly-facing lifting members, and being adapted to be lifted into the traveling position between the side frame members by the upwardly-facing lifting members acting on said downwardly-facing lifting abutments; two rigid locking means on said load-carrying member and spaced apart transversely thereof for rigidly interlocking with the side frame members, respectively, automatically as the load-carrying member is lifted upwardly into the traveling position between the side frame members; and transverse tie means on said load-carrying member for rigidly interconnecting said locking means, whereby to rigidly interconnect the side frame members automatically to prevent relative movement of the side frame members when said load-carrying member is in the traveling position.*

*9. An apparatus as defined in claim 8 including means on said locking means engageable with the side frame members for arresting upward movement of said load-carrying member relative to the frame.*

*10. In a pickup trailer, the combination of: an open, generally U-shaped frame including only a transverse frame member and side frame members rigidly connected to and extending from said transverse frame member; ground contacting wheels journaled intermediate the ends of said side frame members; a trailer hitch secured to said transverse frame members; a separate, detachable load-carrying member receivable between said side frame members, said frame being maneuverable on said wheels relative to said load-carrying member into a position wherein said side frame members straddle said load-carrying member and receive it therebetween; downwardly-facing lifting elements on said load-carrying member; lifting means on said frame including upwardly-facing lifting members on said side frame members and engageable with said lifting elements on said load-carrying member for lifting said load-carrying member upwardly into a traveling position between said side frame members two rigid locking devices on said load-carrying member and spaced apart transversely thereof for rigidly interlocking with said side frame members, respectively, automatically as said load-carrying member is lifted upwardly between said side frame members into said traveling position; and transverse tie means on said load-carrying member and rigidly interconnecting said locking devices, whereby to rigidly interconnect said side frame members through said locking devices and said transverse tie means to prevent relative movement of said side frame members automatically when said load-carrying member is in said traveling position.*

*11. A pickup trailer as defined in claim 10 wherein said locking devices include upwardly-facing elements automatically engageable with downwardly-facing elements on said side frame members, respectively, to arrest upward movement of said load-carrying member relative to said frame.*

*12. A pickup trailer apparatus, including: an open, U-shaped trailer member having a transverse frame member at the front thereof only and having a pair of spaced side frame members rigidly secured to the respective ends of said transverse frame member; a trailer hitch secured to said transverse frame member; ground contacting wheels journaled intermediate the ends of said side frame members; a separate, detachable load-carrying member receivable between said side frame members, said trailer member being maneuverable on said wheels relative to said load-carrying member into a position wherein said side frame members straddle said load-carrying member and receive it therebetween; downwardly-facing lifting elements on said load-carrying member; lifting means pivotally mounted on said frame and engageable with said lifting elements for lifting said load-carrying member upwardly and forwardly into a traveling position between said side frame members and rearwardly of said transverse frame member; a transverse tie means on said load-carrying member; and rigid locking means connected to the outer ends of said transverse tie means for rigidly interlocking with said side frame members automatically in response to upward movement of said load-carrying member into its said traveling position, whereby to arrest upward movement of said load-carrying member and to rigidly lock said side frame members against transverse displacement automatically.*

*13. In combination: a load-carrying member receivable between side frame members of a U-shaped frame by maneuvering the frame into a position wherein the side frame members straddle said load-carrying member, said load-carrying member being movable upwardly relative to the frame into a traveling position between the side frame members; downwardly-facing lifting abutments projecting from said load-carrying member and engageable by lifting means on the frame to move said load-carrying member into the traveling position; and rigidly-interconnected, rigid locking devices on said load-carrying member and spaced apart transversely thereof for rigidly locking said load-carrying member to the side frame members automatically in response to upward movement of said load-carrying member into its traveling position between the side frame members, whereby said locking devices rigidly interconnect the side frame members automatically to prevent displacement thereof relative to each other.*

*14. The combination defined in claim 13 wherein said locking devices include upwardly facing elements adapted to embrace the side frame members, respectively, in response to upward movement of said load-carrying member into its traveling position.*

*15. A pickup vehicle as defined in claim 5 wherein said ground-engaging wheel means includes wheels rotatably mounted on said side frame members intermediate the ends thereof.*

*16. A pickup vehicle as defined in claim 6 including lifting elements on said load-carrying member, said lifting means including lifting members engageable with said lifting elements and pivotally mounted on said side frame members for upward and longitudinal lifting movement toward said one end of said frame.*

*17. A pickup vehicle as defined in claim 6 which is a trailer, said ground-engaging wheel means being rotatably mounted on said side frame members, and said transverse frame member having a trailer hitch connected thereto.*

*18. In a pickup vehicle, the combination of: an open, generally U-shaped frame including a transverse frame member at one end and including side frame members rigidly connected to and extending from said transverse frame member; and lifting means carried by said frame, said lifting means including lifting members pivotally mounted on said side frame members for upward and longitudinal lifting movement toward said one end of said frame.*

*19. A pickup trailer apparatus including a trailer member, a transverse frame at the front of said trailer member, a pair of spaced side frame members rigidly secured to the outer ends of said transverse frame, a hitch secured to said transverse frame, ground contacting wheels journaled intermediate the ends of said side frame members, a load carrying basket member adapted to be presented between said side frame members, means on said trailer member to engage, lift and support said basket member on said trailer member, comprising a front transverse bar member, lever arms fixed to the outer ends of said bar member and pivotally mounted at the outer ends of said transverse frame member, power actuating means on said trailer member for swinging said lever arms and bar member, lifting lugs on the front of said basket having horizontally disposed abutment surfaces presented over and engaging said bar member, and means on the rear portion of said side frame members to engage cooperating members on said basket member to raise and move said basket member forwardly relative to said trailer member.*

*20. In a pickup vehicle, the combination of: an open, generally U-shaped frame including a transverse frame member at one end and including side frame members rigidly connected to and extending from said transverse frame member; and lifting means carried by said frame for lifting a load-carrying member within said frame upwardly and longitudinally toward said one end of said frame, said lifting means including lifting members pivotally mounted on said frame adjacent said transverse frame member and adjacent the free ends of said side frame members.*

References Cited in the file of this patent or the original patent

UNITED STATES PATENTS

| | | |
|---|---|---|
| 1,802,010 | Fitch | Apr. 21, 1931 |
| 2,218,881 | Herlach | Oct. 22, 1940 |
| 2,531,947 | Reading | Nov. 28, 1950 |
| 2,536,563 | Montgomery | Jan. 2, 1951 |